L. M. COOPER.
WHEEL.
APPLICATION FILED MAY 22, 1914.

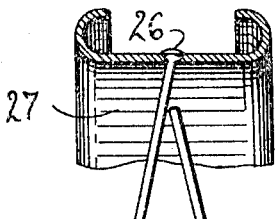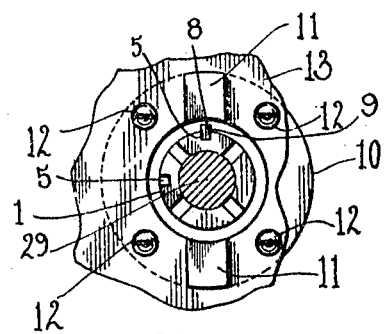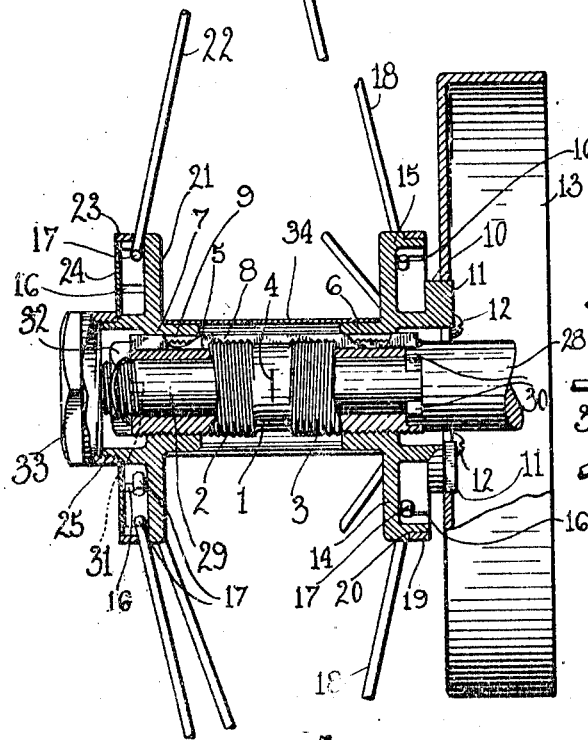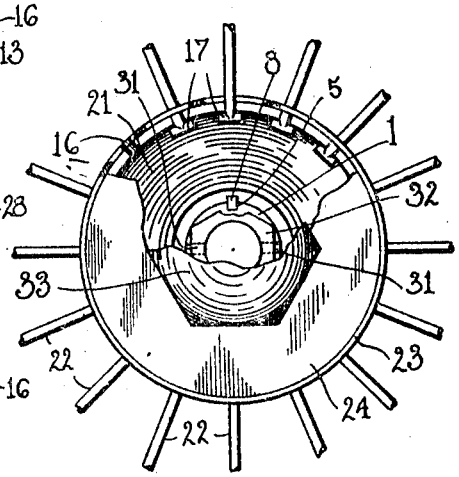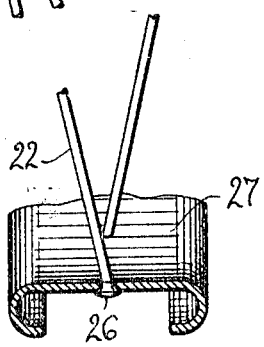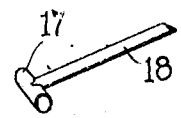

1,119,403.

Patented Dec. 1, 1914.
2 SHEETS—SHEET 2.

Witnesses
Arthur F. Draper
Chas. W. Stauffer

Inventor
Lyman M. Cooper

By Bartlett Bartlett
Attorneys

UNITED STATES PATENT OFFICE.

LYMAN M. COOPER, OF DETROIT, MICHIGAN, ASSIGNOR OF ONE-HALF TO AUGUST T. BIRK, OF OWOSSO, MICHIGAN.

WHEEL.

1,119,403.   Specification of Letters Patent.   Patented Dec. 1, 1914.

Application filed May 22, 1914. Serial No. 840,144.

*To all whom it may concern:*

Be it known that I, LYMAN M. COOPER, a citizen of the United States of America, residing at Detroit, in the county of Wayne and State of Michigan, have invented certain new and useful Improvements in Wheels, of which the following is a specification, reference being had therein to the accompanying drawings.
This invention relates to wheel hubs, and the primary object of my invention is to provide a hub for wheels having wire spokes, the hub being constructed whereby the spokes can be easily and quickly assembled with a uniform tension upon all of the spokes, thereby insuring a perfectly balanced wheel.

A further object of this invention is to provide a strong and durable vehicle wheel that can be advantageously used in connection with automobiles and bicycles, the wheel consisting of comparatively few parts that can be accurately assembled and the wheel easily placed upon a spindle or axle.
With the above and other objects in view, the invention resides in the novel construction, combination and arrangement of parts to be hereinafter specifically described and then claimed.
Reference will now be had to the drawings, wherein—

Figure 5:
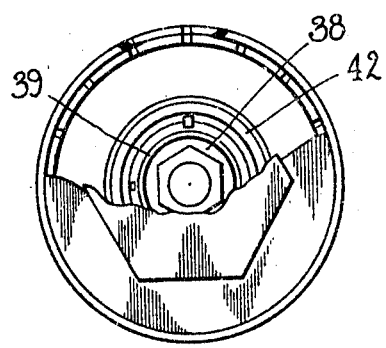
Figure 6:
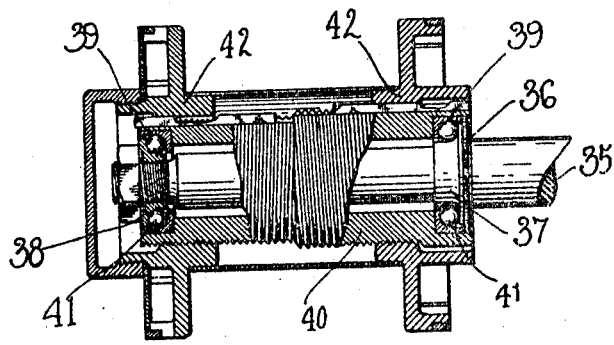

Figure 1 is a vertical cross sectional view of a wheel partly broken away and partly in section; Fig. 2 is a view of a portion of the inner end of the hub of the wheel; Fig. 3 is a view of the outer end of the wheel hub, partly broken away and partly in section; Fig. 4 is a perspective view of the inner end of a detached spoke; Fig. 5 is a view of the outer end of a modified form of wheel hub, and Fig. 6 is a longitudinal sectional view of the same.

In the drawings, the reference numeral 1 denotes a sleeve that has one end thereof provided with right hand screw threads 2 and the other end thereof with left hand screw threads 3, the screw threads 2 and 3 extending from the ends of said sleeve to a point in proximity to the center of said sleeve, the center of said sleeve having a mark or designation 4 to guide a workman in accurately assembling the parts of the wheel hub. The sleeve 1 has the periphery thereof provided with a plurality of longitudinal key ways 5 that intersect the screw threads 2 and 3.

Screwed upon the screw threads 2 and 3 of the sleeve 1 are inner and outer hub members 6 and 7 that are retained in an adjusted position upon said sleeve by a key or spline 8 mounted in a key-way 9 registering with one of the key-ways 5 of said sleeve.

The inner hub member 6 has a flange 10 provided with lugs 11, and secured to said flange by screws 12 or other fastening means is a brake drum 13. This drum has the wall thereof cut away to provide clearance for the lugs 11 and said lugs receive any stresses or strains that would tend to shear the screws or fastening means between the brake drum 13 and the flange 10.

The inner hub member 6, intermediate the ends thereof, has a peripheral web 14 provided with a circular flange 15, which is directed toward the brake drum 13. The flange 15 has equally spaced slots 16 formed therein to receive the T-shaped inner ends 17 of wire spokes or rods 18. The inner ends of the spokes are retained in the slots 16 by a retaining ring 19 fixed or detachably secured upon an annular seat 20 provided therefor upon the periphery of the flange 15. The width of the seat 20 is less than the length of the slots 16, consequently the retaining ring 19 engages the sides of the spokes 18 and coöperates with the T-shaped inner ends thereof in preventing said spokes from becoming accidentally displaced.

The outer hub member 7 has a web 21, spokes 22, a retaining ring 23, and in addition to this retaining ring, there is a circular plate 24 that is fitted upon the outer exteriorly screw threaded end 25 of the hub member 7. Otherwise the outer hub member 7 is very similar in construction to the inner hub member 6.

The spokes 18 and 22 have the outer ends thereof provided with heads 26 engaging in a felly, rim or tire supporting member 27, the outer ends of the spokes being spaced in circumferential alinement.

The reference numeral 28 denotes an axle having a reduced end or spindle 29 providing an annular shoulder which is cut away to form lugs 30 adapted to engage in notches in the inner end of the sleeve 1, said lugs and notches constituting means for interlocking the axle and sleeve for rotative continuity. The outer end of the sleeve 1 has notches 31 to accommodate a spanner wrench or suitable instrument whereby the sleeve can be rotated in the hub members 6 and 7. The outer end of the spindle 29 is exteriorly screw threaded to accommodate a nut 32 and this nut retains the hub upon the spindle of the axle. The exteriorly screw threaded outer end of the outer hub member 7 accommodates a cap 33, said cap engaging the circular plate 24 and assisting in maintaining said plate in engagement with the outer hub member.

Before considering the construction disclosed by Figs. 5 and 6, it is thought best to rehearse the manner of assembling the parts of the wheel hub just described. After the outer ends of the spokes 18 and 22 are placed in the felly 27, the ends of the spokes are up-set and the material forming the ends of the spokes shaped to engage in the openings provided therefor in the felly. The inner and outer hub members are then screwed upon the sleeve 1 until the confronting ends of the hub members meet at the mark 4 of the sleeve. The inner ends of the spokes are then placed in engagement with the flanges of the hub members, the retaining rings placed in position, and then the sleeve 1 rotated whereby the inner and outer hub members will be evenly and gradually separated. As the inner and outer hub members are separated, the spokes are gradually drawn taut and when a proper degree of rigidity is reached, a key is driven home to lock the inner and outer hub members in their adjusted positions upon the sleeve. The sleeve 1 can then be placed upon the spindle 29 of the axle 28 for rotative continuity therewith, said sleeve being retained upon the spindle by the nut 32. As soon as the parts are assembled, a split sleeve 34 can be sprung upon the confronting ends of the inner and outer hub members, as best shown in Fig. 1, said sleeve protecting the threads 2 and 3 of the sleeve 1 and contributing to a neat appearance of the hub structure.

The hub shown in Figs. 5 and 6 has been especially designed for a wheel used upon a front axle, which is designated 35. This axle has a dust guard 36, a permanent ball race or collar 37, and a detachable ball race or collar 38. The ball races 37 and 38 confront ball races 39 arranged in the ends of a sleeve 40, and interposed between the ball races of said sleeve and the ball races of said axle are anti-frictional balls 41. The outer diameter of the sleeve 40 varies, the inner end of said sleeve being a greater diameter than the outer end thereof. One end has right hand screw threads and the other end left hand screw threads, whereby hub members 42 can be simultaneously shifted upon said sleeve by rotating the same. The ends of the sleeve have independent key-ways which permit of the hub members being independently locked.

From the foregoing it will be observed that I have devised novel means for assembling, adjusting and maintaining taut the spokes of a wheel, and while in the drawings there are illustrated the preferred embodiments of my invention, it is to be understood that the structural elements are susceptible to such variations and modifications as fall within the scope of the appended claims.

What I claim is:

1. In a wheel, the combination with an axle having a spindle, of a sleeve on said spindle and having external right and left hand screw threads at its respective ends, hub members having screwthreaded engagement with said sleeve and confronting end portions of equal length adapted to be brought into abutting relation at a point intermediate the ends of the sleeve by a rotation thereof, a rim, and spokes having their outer ends connected to said rim and their inner ends detachably connected to the hub members, whereby a reverse rotative movement of said sleeve will cause the hub members to simultaneously move equally away from said point and by their separating movement draw the spokes taut and center the rim relative to the said sleeve.

2. In a hub for wheels, the combination with an axle having a spindle, of a sleeve arranged upon the spindle and interlocked with said axle, said sleeve having right and left hand screw threads, hub members adjustable longitudinally of said sleeve by a rotative movement thereof, and spokes having the inner ends thereof detachably connected to said hub members.

3. The combination with an axle having a spindle, of an exteriorly screw threaded sleeve arranged upon said spindle and adapted to inter-lock with said axle, inner and outer hub members adapted to be simultaneously shifted longitudinally of said sleeve and to and from one another by a rotative movement of said sleeve, means for locking said hub members relative to said sleeve, slotted flanges supported by said inner and outer hub members, spokes having the inner ends thereof arranged in said flanges, retaining rings mounted upon said flanges and engaging said spokes, and a split sleeve supported by said inner and outer hub members and inclosing exposed portions of said sleeve.

In testimony whereof I affix my signature in presence of two witnesses.

LYMAN M. COOPER.

Witnesses:
  ANNA M. DORR,
  G. E. McGRANN.